Jan. 8, 1946.　　　L. K. ACHESON　　　2,392,716
SUCTION CLEANER
Filed April 26, 1943
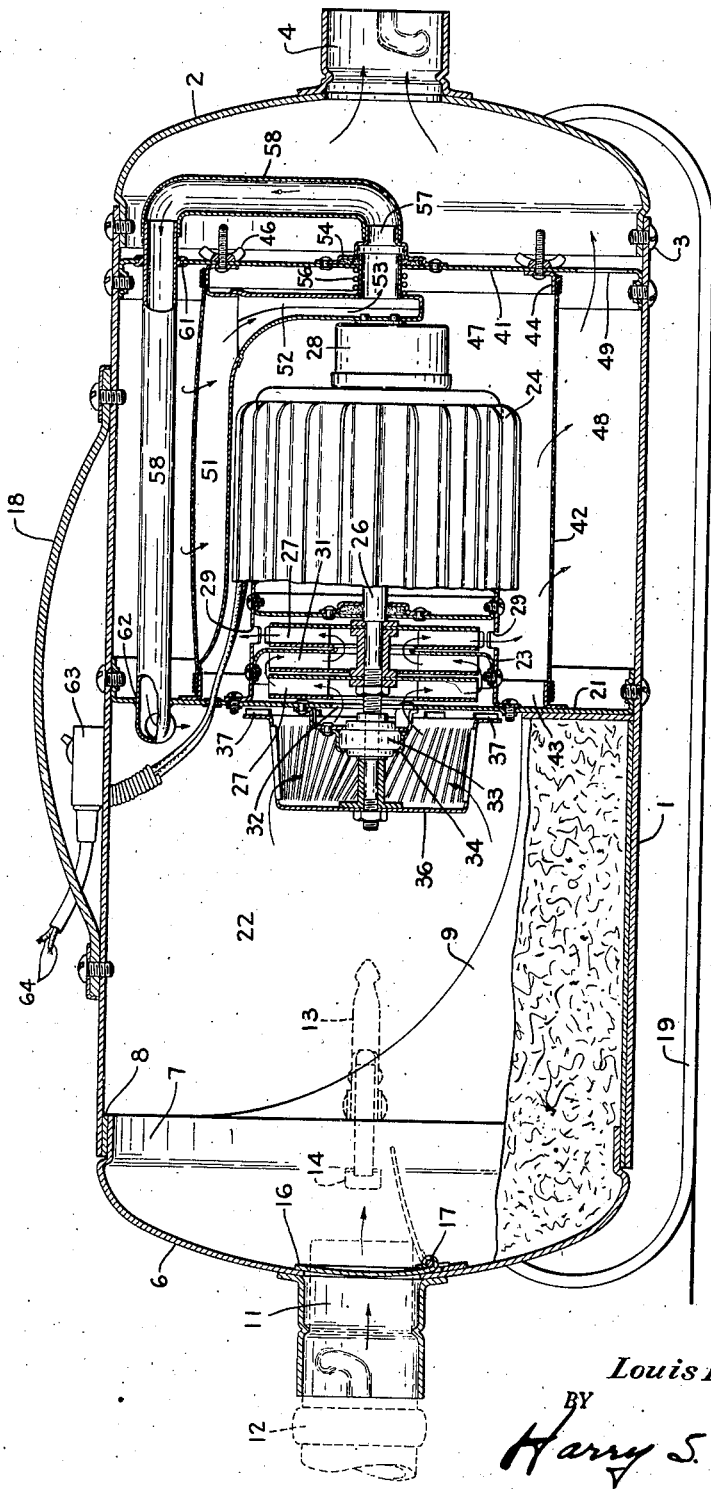
INVENTOR.
Louis K. Acheson
BY
Harry S. Demarest Patented Jan. 8, 1946

2,392,716

UNITED STATES PATENT OFFICE 2,392,716

SUCTION CLEANER

Louis K. Acheson, North Canton, Ohio, assignor to The Hoover Company, North Canton, Ohio, a corporation of Ohio Application April 26, 1943, Serial No. 484,513

3 Claims. (Cl. 183—57)

The present invention relates to suction cleaners in general and more particularly to a new and novel arrangement of parts in a suction cleaner. More specifically, the invention comprises a suction cleaner in which the dirt-laden air stream is drawn by the suction-creating means through an initial dirt separator of the centrifugal type including a rotating separating element and is exhausted by the suction-creating means into a final dirt separator, means being provided which clean the final separator and transfer the collected foreign material therefrom to the initial separator.

It is an object of the present invention to provide a new and improved suction cleaner. It is another object of the invention to provide a new and improved suction cleaner of the type incorporating an initial dirt separator having a driven centrifugal element and a final dirt separator. A still further object of the invention is to provide a suction cleaner having a plurality of dirt separators, the first separator being of the impact separator type and the final separator being provided with cleaning means, the impact separator and the cleaning means both being actuated by the cleaner driving motor. Still another object of the invention is to provide a suction cleaner of the type in which an initial dirt separator has its dirt-removing action supplemented by a final separator, the initial separator being of the impact type and there being continuously operated means which function to remove the collected foreign material from the final separator and to return it to the initial separator. A still further object of the invention is to provide a suction cleaner of the type having an initial impact separator from which air is drawn by suction-creating means which in turn exhausts the air in a substantially clean condition into a final separator, the final separator being provided with a rotary cleaning element which is driven by the main motor of the machine as is the impact separator. These and other more specific objects will appear upon reading the following specification and claims and upon considering in connection therewith the attached drawing to which they relate.

Referring now to the drawing in which a preferred embodiment of the present invention is disclosed:

Figure 1 shows a longitudinal vertical section through a suction cleaner constructed in accordance with a preferred embodiment of the invention.

The usual modern cleaner embodies a suction-creating unit which draws air from the surface-contacting nozzle and moves it to a dirt-filtering unit which is permeable to air but impermeable to foreign material and therefore functions to restrain and filter the foreign material from the air which escapes into the ambient atmosphere. This usual type of machine has the objection that the dust bag must be cleaned at intervals for if not cleaned the resistance to the flow of cleaning air through the machine becomes excessive. Cleaners have in the past been constructed which incorporate mechanical dirt separating means rather than filters, but all of these machines have been characterized by the objection that they permit a small percentage of the foreign material passing therethrough to escape into the atmosphere. While this percentage of escaping foreign material is relatively small, yet it is noticeable to the operator and therefore objectionable. Should the escape of this small percentage of foreign material be eliminated, the mechanical separator type of machine would have many advantages, for the mechanical separator need not be removed and cleaned in emptying foreign material from the machine. Instead it is necessary only to remove a dirt container or pan which is easily emptied.

The suction cleaner of the patent to Bible 2,247,472 illustrates a resognition of this problem and provides a solution which is a material advancement over the prior art. The Bible patent construction provides an initial dirt separator from which the cleaning air is drawn by the suction-creating means which in turn exhaust the substantially clean air into a final filter. To prevent the undue accumulation of foreign material in this final filter there is provided a manually operable filter-cleaning nozzle which is connectible to the intake of the initial dirt separator and which, when in operation, functions to clean the final separator and to re-convey the foreign material therefrom into the initial separator.

The present invention represents an improvement over the construction of Bible 2,247,472 and is a modification of the invention disclosed in applicant's co-pending and co-filed application, Serial No. 484,510. This cleaner comprises an improvement over the Bible construction in that means are provided which continuously maintain the final filter in a clean condition and continuously return the foreign material from the final filter to the initial separator where it is removed, an agglomerating action having taken place. In the embodiment of the invention herein disclosed and claimed the initial dirt separator comprises a motor-driven centrifugal separator and, together with the final filter-cleaning nozzle and the suction-creating unit is actuated by the main cleaning motor.

Referring again to the drawing it is seen that the invention comprises an outer cylindrical casing 1. One end of casing 1 is closed by a cover 2 secured by a plurality of screws 3 and provided centrally with an exhaust port or outlet 4 adapted to seat the cleaner end of a dusting tool hose. The opposite end of the casing 1 is closed by a manually removable cover 6 which carries on its peripheral rim 7 an enclosing ring 8 which makes air-sealing contact with casing 1. An upwardly facing dirt container 9 extends forwardly from the lower side of the ring 8 and may be made integrally therewith. As in the case of cover 2, cover 6 is provided with a port which functions in this case however as an intake and is adapted to seat a dusting tool. The port is indicated by the reference character 11 and the dusting tool 12 is shown attached in dotted lines. Cover 6 and the dirt container 9 are removably secured on and in the casing 1 by means of one or more manually releasable latch elements 13 one of which is indicated in dotted lines in Figure 1. Latches 13 may be of the ordinary over-center pivoted type and each is adapted to cooperate with a fixed abutment 14 on the cover 6. For a reason which will hereinafter be apparent a spring-pressed closure plate 16 is pivotally mounted at 17 upon the cover plate 6 and, in the absence of a dusting tool attached to the port 11, functions to close that port as illustrated in full lines in the drawing.

The cleaner body, which externally comprises the main cylindrical casing 1 and the covers 2 and 6, is mounted upon one or more runners 19 which are suitably connected to the casing 1 in any well known manner to support it slidably upon the floor. A flexible handle 18 is attached to the top of the cylindrical casing section 1 and provides means by which the operator can lift the machine from place to place if he desires.

A transversely extending plate 21 divides the casing into an initial dirt separator chamber 22 which is closed to the remainder of the interior of the casing 1 and in which is positioned the dirt container 9. Mounted on the plate 21 on the side opposite the dirt chamber 22 is a fan chamber 23 and a motor casing 24. The fan chamber 23 and the motor casing 24 may be made unitary or may be made of a plurality of casings, this being a matter of design, but are mounted on the plate 21.

A suitable driving motor is positioned within casing 24 and one end of its shaft 26 extends completely through fan chamber 23, where it carries spaced fan elements 27, while its opposite end adjacent casing 24 extends into a reduction gear casing or box 28 which contains suitable speed-reducing mechanism of any suitable design and which may be of the type illustrated in my aforementioned co-pending application, Serial No. 484,510. Fan chamber 23 is provided with suitable exhaust outlets 29 and a stationary deflector 31 divides the unit into first and second stages, the first stage being connected to the dirt chamber 22 by the fan chamber inlet port 32 formed in the wall 21.

The motor shaft 26, after extending through a suitable supporting bearing 33 mounted on the plate 21 by a suitable apertured mounting 34, carries by direct connection a rotary centrifugal separating element 36 within the chamber 22.

Rotary separator 36 is of a common and well known type and comprises a cup-like casing provided with a plurality of apertures or slots which may be formed by pressing the metal inwardly. The element is in fact a low efficiency fan which works in opposition to the more efficient fans 27 which tend to draw air therethrough and into the fan chamber inlet 32. Separator element 36 functions to permit the air to be drawn therethrough under the action of the fans 27 but prevents dirt and foreign material from entering by driving it radially outwardly by contact when it attempts to enter with the air. To prevent leakage adjacent the wall 21 the peripheral edge of the separator 36 is provided with a plurality of radially extending plates 37 which create an outwardly directed air-moving force.

Within the casing 1 and at a point spaced from the centrally located wall 21 is a second transverse plate or wall 41 which is also fixedly secured in place. Between plates 21 and 41 extends a cylindrical filter element 42 in substantially concentric relationship with respect to the motor shaft 26, although this is not of the essence. Filter 42 is fixedly carried at one end by a flanged ring 43 rigidly secured to the plate 21 and at its opposite end by a similar flanged ring 44 which is secured to plate 41 by a plurality of manually operable nut and bolt assemblies 46 which make it possible, by turning the nut element, to take up any slack or play in the filter 42. The filter 42 forms the enclosing wall of a filter chamber 47 within which are positioned both the fan chamber 23 and the motor casing 24 and it represents the only escape for air which has been drawn through the fan unit and exhausted through the exhaust outlet 29 thereof. Around the final filter 42 and within the casing 1 is what may be termed the discharge chamber or passageway 48 which is open through ports 49 in the end wall 41 into the cover 2 and so to the exhaust port 4.

As the final filter 42 is positioned within the cleaner at an inaccessible point, means must be provided to remove collected foreign material therefrom. These means comprise a rotatable filter-cleaning nozzle 51 which extends the full length of the filter 42 and which is rotatably mounted by means of a conduit seat 52 rotated at reduced speed by the suitable speed-reducing means positioned within the gear box 28. These speed-reducing means may be of the type disclosed in my co-pending application above referred to. Conduit seat 52 is provided with a portion 53 which extends axially through a sealing bushing 54 in the plate 41, a coil spring 56 being provided concentrically thereof to exert a pressure between wall 41 and conduit seat 52 to prevent any unnecessary play. Exteriorly of the final filter chamber 47 and in alignment with the conduit 53 the wall 41 carries a nipple 57 to which is attached a conduit 58 which extends transversely across the machine and back through sealed openings 61 and 62 in walls 41 and 21, respectively, to open into the initial separating chamber 22. It is clear that the suction present within the initial chamber 22 as a result of the suction-creating power of the fans 27 in rotation will be effective within the filter-cleaning nozzle 51.

As in the usual suction cleaner a manually operable switch is provided which is indicated at 63 and through which the incoming current-conducting leads 64 extend on their way to the driving motor positioned within casing 24. The closing of switch 63 effects the passage of current to the driving motor and simultaneously puts into operation the suction-creating means, the impact separator, and the filter-cleaning means for the final filter.

The suction cleaner constructed in accordance with the present invention is easily operated and foreign material collected therein is readily removed. In operation an ordinary dusting tool unit would be attached to the intake port 11 and such unit would ordinarily be provided with a cleaning nozzle at its outer end. The closing of the motor switch 63 effects the rotation of the driving motor, and the shaft 26 in its rotation causes the fans 27, the impact separator 36, and the filter-cleaning nozzle 51 all to rotate. The suction created by the fans 27 is effective through the fan chamber inlet 32 to create a reduced pressure within the initial separating chamber 22 and cleaning air is drawn through the dusting tool unit, through the port 11, the valve 16 being held in the open position by the inserted cleaner end of the dusting tool hose as shown in the drawing, and the cleaning air and any foreign material suspended therein is drawn into chamber 22. The air and foreign material is drawn toward the fan chamber inlet 32 but must of necessity pass through the apertures or ports in the rotating separator element 36 before reaching that point. The air, less practically all of the foreign material carried thereby, does pass through the separator and enters the fan chamber. The foreign material particles, however, are thrown radially outward by the high speed rotation of the separator element and finally drop into the dirt container 9 which forms the bottom of the chamber 22. The cleaned air continues on its way through the first and second stages of the fan unit and is exhausted into the final filter chamber 47 through the fan chamber exhaust ports 29. From chamber 47 the air must pass outwardly through the final filter element 42 which thereupon removes any foreign material which remains in the air stream. Upon leaving the chamber 47 the air enters the discharge chamber 48 and continues on its way through ports 49 and exits from the cleaner through the exhaust port 4.

During this operation the filter-cleaning nozzle 51 has moved in cleaning relationship over the inner surface of the filter 42 at low speed having been actuated continuously by the speed-reducing means within the casing 28. The reduced pressure effective within the initial chamber 22 is also present within the filter-cleaning nozzle 51 which is interiorly connected thereto through the conduit 58 and, as to that part of the final filter 42 which is contacted by the slot-like mouth of the nozzle 51, the flow of air through filter 42 is reversed and it travels from the discharge chamber 48 inwardly through the filter and into the nozzle. From the nozzle it is drawn into the initial separating chamber 22 where it mingles with the air entering the machine for the first time. This continuous movement of the filter-cleaning nozzle over the final separator keeps it in a cleaned condition and prevents building up of a back pressure which would reduce cleaning efficiency.

After extended use it will become necessary to empty the dirt container 9. To accomplish this the dusting tool hose 12 is first detached from the intake port 11, whereupon the spring-pressed closure plate 16 moves to the closing position.

The operator then releases the latch or latches 13 whereupon he can withdraw from the casing 1 the removable cover 6 and the dirt container 9 which is fixed thereto. In this operation the intake port 11 can well serve as a handle, escape of foreign material therethrough being prevented by the closed valve 16.

The foreign material can be emptied from the container 9 merely by inverting it, whereupon the entire removed assembly can be re-inserted and re-secured onto the casing 1.

Should the operator desire to use the cleaner for blowing purposes a dusting tool unit would be attached to the exhaust port 4 so that air under pressure would pass through the dusting tool. In such an event, however, it would be necessary to attach a dusting tool element to the intake port 11 in order to hold the closure plate 16 in open position so that air could be admitted to the machine.

I claim:

1. In a suction cleaner of the type having an initial dirt separator including a rotary dirt-separating element, suction-creating means to draw air from said initial separator, and a final dirt separator to receive air from said suction-creating means; a dirt-removing unit to remove dirt from said final separator and to transport it to said initial separator and including a movable element, said unit functioning to reduce the back pressure of said suction-creating means and thereby increase the air flow through said initial dirt separator, and a driving motor to actuate said separating element, said suction-creating means and said movable element.

2. In a suction cleaner of the type having an initial dirt separator including a rotary dirt-separating element, a driving motor having its shaft extended to carry said separating element, a suction-creating unit to draw air through said initial separator and including a fan carried by said shaft, and a final dirt separator to receive air from said suction-creating unit; a dirt-removing unit to remove dirt from said final separator and including a movable element, said unit functioning to reduce the back pressure of said suction-creating means and thereby increase the air flow through said initial dirt separator, speed-reducing means connecting said movable element to said shaft, said rotary dirt-separating element, said fan, and said movable element all being rotatable about the axis of said motor shaft.

3. In a suction cleaner of the type having an initial dirt separator including a rotary dirt-separating element, a suction-creating unit to draw air through said initial separator and including a fan, a motor having an extended shaft carrying said separating element and said fan, and a final dirt separator to receive air exhausted from said suction-creating unit including a cylindrical filter with its axis arranged parallel to said shaft; a filter-cleaning nozzle movable over the surface of said filter to remove dirt from said filter to reduce the back pressure of said suction-creating means and thereby increase the air flow through said initial separator, air conducting means connecting said nozzle to said initial separator, power-transmitting speed-reducing means connecting said nozzle to said shaft, said rotary dirt-separating element, said fan, and said movable element all being rotatable about the axis of said motor shaft.

LOUIS K. ACHESON.